March 20, 1962   H. R. JAQUITH ET AL   3,025,868
CONTROL SYSTEM
Filed July 21, 1958   3 Sheets-Sheet 1

INVENTOR.
Howard R. Jaquith
J. Philip Hurdle
BY
P. J. Young, Jr.

March 20, 1962     H. R. JAQUITH ET AL     3,025,868
CONTROL SYSTEM
Filed July 21, 1958     3 Sheets-Sheet 2
FIG. 3
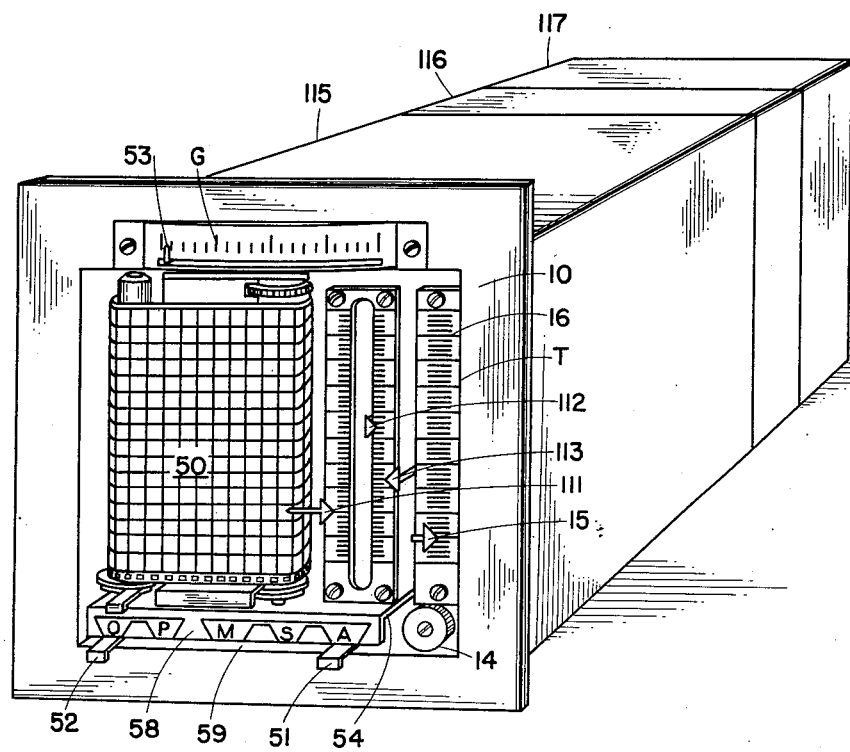
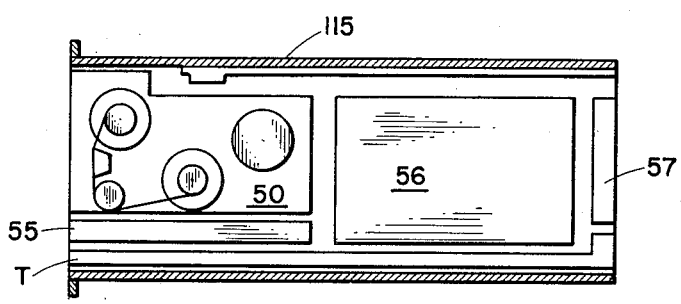
FIG. 4
INVENTOR.
Howard R. Jaquith
J. Philip Hurdle
BY INVENTOR.
Howard R. Jaquith
J. Philip Hurdle United States Patent Office 3,025,868
Patented Mar. 20, 1962

3,025,868
CONTROL SYSTEM
Howard R. Jaquith, Rochester, and Junius Philip Hurdle, Fairport, N.Y., assignors to Taylor Instrument Companies, Rochester, N.Y., a corporation of New York
Filed July 21, 1958, Ser. No. 749,987
22 Claims. (Cl. 137—85)

This invention relates to instrumentalities involved in the control of processes. In particular, our invention relates to control instruments, wherein an automatic controller, exhibiting means such as recording and/or indicating devices, and other apparatus appurtenant to the use of the controller, are arranged in more or less compact form so as to economize on space and instrument structure, yet withal to allow fullest use of the controller.

As is well-known, an automatic controller is a device that measures some process variable indicative of the state of a process and modifies the state of the said process accordingly. For example, the process may be that of heat exchange between a body of material and some source of heat such as steam, the desired state of the process being that in which a rate of heat exchange obtains such that a temperature at some point in said body stays at a given value. In such cases, the typical function of an automatic controller is to measure deviation of the said temperature from said given value and modify the rate of heat exchange in such fashion as to cause said temperature to attain and keep said given value. Thus, the controller would respond to such deviation by actuating a final control element such as a flow control valve controlling the rate of flow of steam through a heating coil in thermal contact with the aforesaid body of material.

Obviously, the foregoing describes but one of an almost endless class of process control situations wherein although the process entities involved are other than temperature, heat exchange, a flow control valve and/or a body of material being heated, the essential control problem from the point of view of the automatic controller is the same, to wit, to measure deviation of some process condition from a desired value and in response to affect some final control element so as to cause the measured condition to attain and keep the said desired value.

Often, however, it is necessary to coordinate many processes, each of which is individually controlled more or less the fashion described supra. Where such coordination requires the use of human faculties, it is necessary to centralize overall control in order to permit supervision as a whole of the complex of processes to be coordinated. The result is that whereas the process complex, i.e., a plant or other unit of production, service, etc., may amount to a large array of process apparatus so dispersed that it is not feasible for human operatives to attempt to assay or coordinate the overall operation as a whole directly from the said array, the control instrument or instruments for each individual process may be collected together at a central point. The central point is generally a vertical panel on which literally hundreds of instruments are closely packed in order to minimize the number of personnel, and the effort required of them, in coordinating overall operation of the process complex.

Since costs of panel space per se or equivalent are accounted quite high and there may be hundreds of individual instruments, the cost of a typical centralized control installation can be expected at the present time to run well over a thousand dollars per foot of instrumented panel width.

Therefore, dictates of economy have led to the development of a compact instrument mountable in a relatively small panel space (e.g., in a panel cut-out approximately six inches square), yet providing current and past information as to the behavior of a process, and allowing so-called automatic and manual control of a process.

Obviously one of the basic problems is designing a suitable control instrument is to satisfactorily compromise such factors as structural simplicity, compactness and cheapness, with quality, versatility, and complexity of the functional characteristics of the instrument.

As will be more particularly pointed out hereinafter, prior art control instruments of the described type are not entirely satisfactory solutions to the problem since their design is such that optimum utilization thereof for purposes of process control is overly dependent on the structural integrity of the instrument.

One object of the present invention is to provide a control instrument of the general type described supra which permits optimum utilization thereof for purposes of process control even through the structural integrity of the instrument is violated by removing or disabling one or more major components of the instrument.

In particular, it is the object of the invention to provide a control instrument conforming generally to prior art practice by including a controller for operating a final control element in correspondence to the deviation of a process condition from a desired value of said condition, a means alternately capable of providing a measure of said desired value or of operating said final control element in place of said controller, and sundry exhibiting devices having variously the functions of indicating and/or recording information relevant to the operation of the controller and of the process being controlled, but wherein the said control instrument, in contrast to the prior art, has said controller and said means so arranged, that certain of the said exhibiting devices may be removed from said instrument without materially affecting the functions of said controller and said means.

Obviously, an instrument fulfilling the described objects permits obvious operational benefits such as being less likely to interfere with carrying out a process because of instrument defects, and also permits economics such as a reduced replacement or spare parts inventory. Thus, with an instrument of our invention, certain defective components may be removed and repaired at leisure, more or less, while the remainder of the instrument continues to control. Under the same circumstances, in a prior art instrument it would be necessary to replace the defective component immediately, and/or interfere with the control of the process.

Other objects and advantages of the invention will appear as the disclosure proceeds.

In the drawings:

FIGURES 3 and 4 show exterior and interior component layout of a recorder-controller instrument according to the invention.

Figure 1:
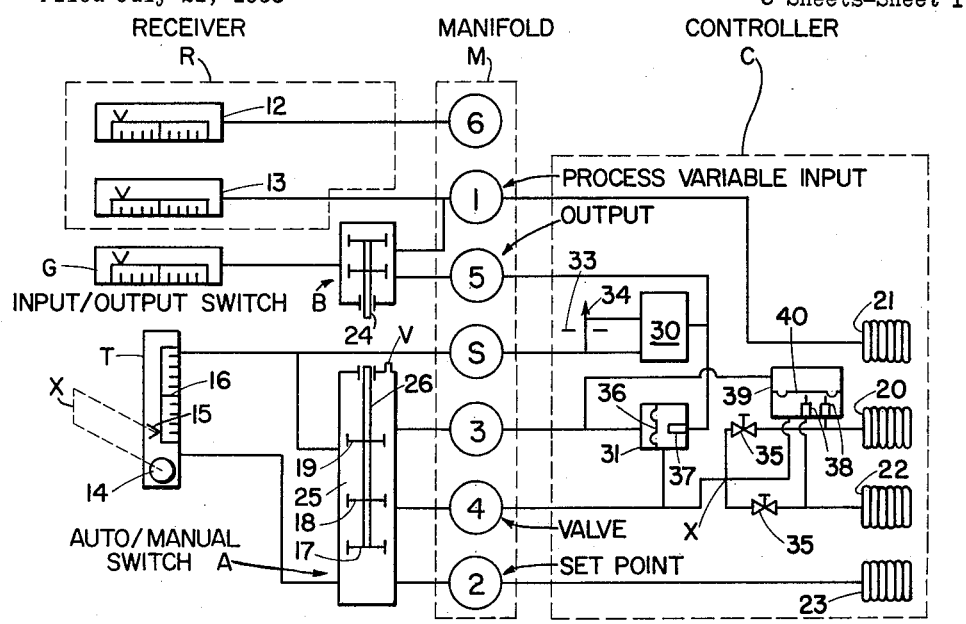
FIGURE 1 shows a control system according to the invention wherein a control instrument including a single controller is used for the purposes of "automatic" and "manual" control.

In FIGURE 1, the dotted outlines C, M and R represent in that order a controller (such as shown in the copending application of H. R. Jaquith, S.N. 626,537, filed December 5, 1956, entitled "Motion-Compounding Relay or Controller Device" and assigned to the assignee of the present application), a manifold and a receiver. The receiver R includes two pressure gages, or equivalent, numbered 12 and 13, connected to ports 6 and 1 in manifold M, the said ports also being connected to the individual exterior sources of pressure (not shown) it is desired to measure by means of gages 12 and 13. Port 1 is also connected to a process variable pressure bellows 21, corresponding to the identically numbered bellows of the said Jaquith application. In analogous fashion, a set point bellows 23 is connected by manifold port 2 to the output of a set point pressure regulator or transmitter T.

As thus far described, FIGURE 1 obviously represents an instrument such as might be utilized in controlling a process such as has been briefly discussed supra. In such case, the external pressure admitted to port 1 would be the output of a so-called temperature transmitter, i.e., a device responsive to some temperature in the process environment to establish a pressure in gauge 13 and bellows 21 that is proportional to said temperature.

Set point transmitter T would establish a pressure representative of the desired value of said temperature, this pressure being adjustable to the desired value by hand. As will be obvious to those skilled in the art, in automatic control controller C compares said pressures and produces an output pressure in port 4 that tends to move a process control valve or other final control element (not shown, but connected to port 4) in such fashion, as to vary said temperature until the pressure representing said temperature bears some predetermined relation to the set point pressure. Generally, as in the Jaquith controller, such relation is substantially equality.

In the prior art, it has been customary to utilize one of the receiver pressure gages, or its equivalent, to measure set point transmitter output pressure. However, the usual set point pressure source is in the way of being a pressure regulator having a knob or lever that is turned or moved to vary proportionally the pressure the regulator will maintain in some load such as a bellows connected to its output, and hence the angular position of the knob, or deflected position of the lever may be taken as a measure of set point pressure.

The set point transmitter T is provided with a knob 14 which is rotated to vary the output pressure of the transmitter into set point bellows 23 of controller C. Therefore, to eliminate the use of one of the gages in receiver R for set point pressure measurement, we provide, according to the invention, a simple extent of rotation indicator having a pointer 15 moving over scale 16 to indicate how far knob 14 has been rotated from some reference position, the indicia of scale 16 being correlated with the pressure output of the transmitter. Reference should be had to our divisional copending application for Control Instruments, S.N. 123,067 filed July 10, 1961, and assigned to the assignee of the present application for the description of a set point transmitter of this type which is generally designed for use in the present invention. However, those skilled in the art will be able to conceive of numerous suitable forms of set point transmitters of the type wherein set point pressure can be indicated without the help of a pressure gauge. Therefore, in FIGURE 1, we portray the desired self-indicating (so to speak) characteristic of the transmitter T by dashed-line ganging X of knob 14 with indicator 15. In short, ganging X represents any suitable motion transmitting mechanism by means of which knob rotation moves pointer 15 along seal 16.

As is known in the art, it is advantageous to make the set point transmitter or regulator independent of the receiver. Otherwise, if the instrument is automatically controlling the process and it is necessary to remove the receiver for repair or service, and receiver removal also entails removal of said set point transmitter or regulator, it is necessary to seal the connection of the control valve off from the instrument. On first glance, it may seem that removal of receiver and set point transmitter need not disturb instrument connections to the control valve, if the set point connection of the controller is arranged so that it can be sealed-off upon set point transmitter removal so that the last value of set point pressure furnished to the controller remains sealed in the set point bellows or the like of the controller. However, the set point volume of a controller is quite small, and a slight leakage therefrom which a set point transmitter would more or less compensate for, could cause a considerable upset in the process by dropping the sealed-off pressure in the set point volume of the controller. On the other hand, the volume of the control valve and its connections to the instrument is relatively large enough that some leakage therefrom can be tolerated.

While the foregoing is understood in the prior art, it does not appear that prior to our invention that those skilled in the art have realized the advantageous results of both making the set point transmitter independent of the receiver, and of providing it with set-point indicating means also independent of the receiver.

However, according to our invention, if set point indication as well as the set point transmitter is made independent of the presence of the receiver, not only may automatic control be continued with the receiver removed, but it is also possible to make set point changes under the same circumstances. The latter facility is of considerable utility since in some types of processes, accurate set point changes are desired to be made according to considerations such as a time schedule or information as to process behavior independent of that information normally obtained from the control instrument.

Moreover, since we not only make set point indication independent of the receiver, but also adopt the specific expedient of what amounts in effect to making knob 14 both adjust set point pressure and indicate set point pressure in terms of the extent of such adjustment, our novel control instrument eliminates the need for a set point pressure gage altogether. The net effect is elimination of an instrument component, since the conventional set point pressure gage, i.e., some sort of indicating mechanism combined with a pressure responsive device connectible to set point pressure, has been replaced solely by an indicating mechanism connected to the knob or other means for adjusting the set point pressure. Hence, our invention both reduces the number of instrument components necessary for performance of the usual functions of a control instrument of the type involved, and makes certain of said functions available under circumstances wherein the prior art version of said control instrument would not perform such functions.

Prior art instruments also include a so-called valve gage, i.e., a pressure gage connected into the control system so as to provide for indication of the pressure acting on a process control valve or other final control element of said system. The arrangement is such that a control valve pressure indication is available irrespective of whether the control valve is being operated in manual control of the set point pressure transmitter, or in automatic control by the controller output pressure. The valve gage generally is also mounted in the instrument independently of the receiver.

If the control instrument according to our invention also has the usual independently mounted valve gage, and in addition, the usual valve means for switching the pressure connection of the control valve or other final control element between set point pressure and controller output pressure, it is also possible to transfer the process smoothly from automatic control to manual control in the absence of the receiver since knowledge of both valve pressure and set point pressure is still available.

It is obvious from the foregoing that knowledge of set point pressure in the absence of the receiver is of considerable utility.

Further according to our invention, the valve pressure gage can be put to far better uses than merely indicating valve pressure. These uses are obtained simply by making one or another of several possible changes in the connection of the valve gage in the control instrument.

One such change would be to connect the valve gage (i.e., gage G of FIGURE 1) to port 1 of manifold M. Since the valve gage is independent of the receiver, therefore in addition to the feature of set point indication independent of the receiver, process variable indication and smooth transfer from manual to automatic control without the aid of the receiver are now possible. Obviously, without valve pressure indication smooth transfer from automatic to manual control is not readily possible. On the other hand, smooth transfer to manual control is not always a critical requirement, and at the very least, the availability of process variable indication, and of smooth transfer from manual to automatic control, is advantageous in itself.

However, if gage G is connected to port 4 instead of to port 1, all the control functions as such of the receiverless instrument are available, as well as if the receiver were operatively in place in the instrument. While process variable indication is no longer available in the absence of the receiver, both transfer from manual to automatic control and from automatic to manual control can be carried out smoothly.

This result is due to the fact that in automatic control, controller output is identically valve pressure, whereas in manual control, valve pressure and controller output pressure are distinct, although in rare cases valve pressure and controller output pressure might coincidentally have the same value. Under these circumstances the usual practice of matching set point pressure to valve pressure can be followed in going from automatic to manual control. As for transfer from manual to automatic, the controller C possesses an inherent behavior characteristic that enables a procedure termed control or set point detection to be utilized in transfer from manual to automatic control relying only on response of gage G to controller output pressure. Control point detection will be described infra in considerable detail, but it is noted here that it is an extremely precise expedient for matching set point and process variable pressures, and at the same time is independent of manufacturing tolerances of gages, controller and set point transmitter, such as result in matching errors when other ways of transferring from manual to automatic control are utilized.

Still another feature of our invention permits combination in one instrument of the results obtained by the two variations in valve gage connection just described. Namely, the addition of a switch or valve, e.g., switch B in FIGURE 1, permits gage G to be connected to port 1 or to port 4, as desired. With this additional feature, an instrument according to the invention in the absence of a receiver retains every basic function generally desired of a control instrument of the type described, namely, automatic control, manual control, smooth transfer between automatic control and manual control in each direction, set point indication and adjustment, process variable indication and controller output indication. To our knowledge none of these features are possible are any prior art instrument in the absence of its receiver, except automatic control and set point adjustment (in a very restricted fashion, since the prior art instrument must be on automatic before removing the receiver, and set point pressure adjustment after the receiver is removed must be performed in ignorance of its amount and effect). Moreover, the instrument of our invention performs all the said functions as well as if the receiver were in place. Most remarkably, the superiority of our novel control instrument to the prior art is gained almost entirely by what amounts to a rearrangement of the elements of its prior art counterpart, and only in the most refined of the versions of our instrument just described is additional structure (i.e., switch B of FIGURE 1) necessary.

As a preliminary to a more detailed description of our invention, note briefly FIGURES 3 and 4, which show the typical format of the control instrument of the type involved in this application. A complete prior art instrument and the simpler forms of our novel instrument, typically would include gage G, set point knob 14, set point scale 16, set pointer 15, automatic-manual transfer valve operator or lever 51, process variable pointer-stylus 111 and its associated scale and recording apparatus. The essential distinction between our invention in such form and the prior art would be that in removing the prior art receiver, all indicating and/or recording devices but the gage G would be taken from casing 117, whereas according to our invention set pointer 15 and scale 16 would remain (along with mechanism that operates them). Preferably, the transmitter T would take the form shown in our aforesaid divisional application, since it is not only self-indicating, but is also proportioned to suit the configuration indicated in FIGURES 3 and 4.

Even the aforementioned switch B (FIGURE 4 shows a lever 52 as a means for operating said switch) has its prior art counterpart, namely the so-called cascade-set switch which permits replacing at will the internal set point pressure of the prior art instrument by an external set point pressure. The difference between a typical prior art instrument with internal set point and a prior art instrument with both external and internal set point is essentially nil, except for the cascade-set switch and certain connections required for utilization of external setting. Hence, our invention, from one point of view, teaches a novel arrangement of what amounts to the component complement of a cascade instrument so as to obtain a new mode of operation.

The foregoing shows very clearly that the advantageous results of following our teachings may be obtained without encroaching upon limitations of size, compactness, uniformity, etc., adhered to in the inferior designs of the prior art.

The foregoing is a brief but complete and clear account of the broader principles of our invention and its relations to and advantages over the prior art. As it happens, realization of the said principles in the form of a particular type of control circuit utilizing specific instrumentalities as components thereof both reveals more clearly the advantages of our basic invention and results in patentable invention in addition to our basic invention as disclosed supra. Therefore, we now turn to a more detailed consideration of our invention in the light of the drawings annexed hereto.

The control circuit of FIGURE 1 includes a switch A for the usual role of respectively putting the process under the automatic control of the controller, sealing the controller and valve off from one another and from the set point regulator or transmitter, and, finally, supplanting the controller by the set point transmitter to permit what is termed "manual" control. Switch A, and switch B as well, are shown as slide valves, although insofar as is concerned the overall circuit, specifically different types of valve devices can be used to perform the same switching functions.

Switch A comprises a cylindrical hollow casing 25, to the interior of which are connected ports 2, 3, 4 and S, and the output of transmitter T. To control intercommunications between the various port connections, there is provided a seal assembly including rod 26 and seals 17, 18 and 19. Each seal sealingly contacts the bore wall of cylindrical casing 25, so that each interseal space forms a compartment sealed off from the remainder of the valve casing interior. To make the various interconnections, rod 26 is simply slid in or out of the casing to positions in which different sets of port connections, etc., are straddled by adjacent seals.

As indicated by the reference character V, switch A vents to the atmosphere exterior to switch casing 25. In the position shown, port 3 is vented to atmosphere, whereas pressure from port S is dead-ended between seals 18 and 19.

As shown, switch B is of similar construction except that since its function is simply to selectively connect one or the other of ports 1 and 5 to gage G, it does not vent.

The controller C, as has been stated, may be of the type disclosed in the aforesaid Jaquith application and, hence, includes a nozzle 34 supplied with air via orifice 33 from air supply port S of manifold M, and a booster relay 30 supplied with operating air directly from port S, the booster relay output being fed to follow-up and reset bellows 20 and 22 through a cut-off relay 31. The cut-off relay is normally used in pneumatic circuits of this type, since otherwise in certain positions of switch A, booster relay 30 and transmitter T may be put in the position of attempting to establish two different output pressures at the same time in a common capacity interconnecting transmitter and relay. The cut-off relay is also necessary for purposes of control point detection.

Although having a less elaborate feedback network than shown in FIGURE 3 of the aforesaid Jaquith application, in automatic service controller C behaves as explained in the Jaquith application. Thus, when switch A is in the position shown, the usual external source of dry, clean air at an approximately fixed pressure is supplied to port S, a pressure from an external source and representing some process condition is connected to bellows 21 via port 1, and an external valve or equivalent final control element is connected to port 4 to be actuated by controller output for changing the value of said process condition or restoring it to some given value determined by the output of transmitter T into bellows 23, the controller will produce a pressure output in accordance with the relations among the pressures in bellows 20 to 23 inclusive. Briefly, a baffle (not shown) is caused to throttle or unthrottle nozzle 34 in response to changes of pressure in bellows 21, the resultant change in nozzle back pressure being repeated by booster relay 30 into piping connected with the bellows 20 and 22 and port 4, with the result that a balance plate or crossbar (not shown) interconnecting bellows 20, 21, 22 and 23 repositions the baffle, as more fully described in the said copending Jaquith application.

Supposing that a process control valve or like final control element is connected to port 4 of manifold M, for purposes of manual control of the position of said valve, rod 26 of switch A will have been pulled out of said casing until seals 18 and 19 straddle the connections of ports 3 and S to switch casing 25, and seals 17 and 18 are between the connections of ports 3 and 4 to said casing.

In this position of switch A, usually termed "manual," the output of booster relay 30 dead-ends in cut-off relay 31, since supply pressure from port S acts via port 3 on diaphragm 36 to close off the connection 37, whereas bellows 20, 22 and 23 and the said control valve are connected via ports 2 and 4 to the output of set point transmitter T.

Therefore, the pressure on the final control element is a function of the extent of rotation of knob 14, and the position or control effect of said element can be controlled by manual adjustment of knob 14. Accordingly, in the heat exchange process described briefly supra, a human operative can utilize knob 14 to control supply of heat to the process environment until some temperature therein represented by an external pressure transmitted to port 1 reaches a value such that it becomes convenient to transfer process control to the controller C.

At this point it is very unlikely that the control valve is holding the process is any enduring state of equilibrium. Instead, the valve is more likely to be in some position such that the valve, if unchecked, will sooner or later cause too much heat to be injected into the process environment.

For example, if the process temperature responds slowly to admission of heat, the control valve may have been opened wide to get the process temperature to the desired value quickly. Therefore, it is necessary to establish a set point for the controller corresponding to the temperature at which automatic control is to begin. Accordingly, switch A is put in seal position, to wit, rod 26 is moved until seals 17 and 18 straddle port 4, with seals 18 and 19 straddling the connections of port 3 and port S, so that now port 4 is sealed off from both controller and set point transmitter outputs. If an indication of process temperature is available at this time, the knob 14 of transmitter T is then turned until pointer 15 indicates on scale 16 the corresponding value of set point pressure.

At this point, rod 26 can be moved to the position shown in FIGURE 1, and when this occurs, the connection of port S to the switch dead-ends between seals 18 and 19, and port 3 communicates with the atmosphere via vent V, thus releasing the pressure on diaphragm 36 and allowing the output of booster relay 30 to pass through cut-off relay 31. Controller C now establishes an output pressure on the control valve via port 4, which pressure is a function of the relationship among the pressures in bellows 20 to 23, inclusive.

In the prior art, the foregoing use of the control instrument is not possible without the aid of a receiver, since no knowledge of the actual state of the process variable is then available. This defect is practically a standard feature of the prior art, since the usual prior art design often deliberately compounds the difficulty by making the switch A and even the set point transmitter or regulator part of the receiver.

In contrast, our novel control instrument remains a complete control instrument even in the absence of the receiver, since we use what amounts to the conventional valve gage as a means for obtaining the information needed to perform the transfer from manual to automatic control. For the same reason, we mount switch A and the self-indicating set point transmitter T independently of the receiver.

In transferring control in the opposite direction, i.e., from automatic to manual, smooth transfer is not usually essential, since the usual case is that when manual control is adverted to it is either because the process is already acting badly and some drastic step such as controller repair or replacement is necessary, or because it is desired to shut the process down. However, in this case if smooth transfer is required, switch B may be provided in order to allow determining valve pressure as well as process variable pressure. To go from automatic to manual it is first necessary to move rod 24 until the switch B seals straddle both the connection of port 5 and the connection of gage G to the switch, note the reading of gage G, and then move rod 26 of switch A to seal position. Knob 14 is then turned until the pointer 15 indicates a reading on scale 16 corresponding to the noted reading of gage G. If rod 26 is now moved to manual position, the control valve will be supplied with a set point pressure substantially the same as the last controller output pressure felt by the valve, and therefore knob 14 may be manipulated to move the control valve in any desired fashion from the place where the controller left it when automatic control ceased.

In practicing the type of control transfer just described, the readings of scales are utilized, so that the operator must assume that when the indications on gage scales and transmitter scale implicitly or explicitly denote the same value of pressure or process variable, the pressures in bellows 20 and 23 are equal, and the controller is balanced. However, due to normal commercial tolerances involved in manufacturing gages or equivalent devices, what the scale readings nominally denote as equality may in reality correspond to a considerable deviation from equality. Hence, in transferring from manual to automatic control, it will sometimes happen that the controller will be switched on the process while producing an output corresponding, not to equality of the actual value of the process variable pressure and the set point pressure, but to a deviation between such pressures corresponding to the error involved in taking scale readings at face value.

Such errors may be tolerated in many cases of process control, but other types of process may require matching of set point and process variable values to a closer extent than gage tolerances, etc., permit.

For example, very precise matching would be required in a process of the type wherein it takes the process a relatively long time—hours, perhaps—to detectibly respond to a movement or effect of the control valve corresponding to the error in relying on comparative scale readings for transferring the process from manual to automatic control in the fashion described supra. In such cases, the consequence of the error is that after considerable manual control pains may have been taken to get the process to the desired state, sometime (depending on the time constant of the process) after the process has been placed under automatic control of the controller, it will be found that the process is being or has been driven by the controller to a different state because of such error. If the essence of the process is the treatment of some material by action of heat or chemicals, etc., the error due to control transfer may result in as serious a consequence as a spoiled product. At the very least, such error will necessitate the expense and inconvenience of correcting the error.

In short, a long time constant process will suffer a "bump," if transfer from manual to automatic control is undertaken with mismatched set point and process variable pressures.

However, where close matching of pressures is necessary, the circuit of FIGURE 1 affords the very precise technique of matching known as control point detection and, according to our invention, such facility is afforded independent of the presence or absence of receiver R, and even in complete lack of any of the usual indications of the valve of the process variable.

Specifically, when the switch A is in seal position, the diaphragm 36 of cut-off relay 31 closes connection 37 and thus isolates the controller baffle and nozzle and booster relay 30, or equivalent process variable change responsive means from the feedback circuit (restrictions 35 and bellows 20 and 22) of the controller. Hence, if set point pressure is above or below process variable pressure, baffle and nozzle will be so related to each other as to produce one or the other extremes of nozzle back pressure, and, moreover, if set point pressure changes between above and below process variable pressure, nozzle back pressure will change from one extreme to the other. Obviously, this phenomenon is due to the fact that without negative feedback, baffle and nozzle need to change their relative spacing about one-thousandth of an inch in order to encompass the range of proportionality between nozzle-baffle spacing and nozzle back pressure. Accordingly, booster relay output will change between maximum and minimum if the baffle traverses the said spacing.

Under these circumstances, set point pressure and process variable pressure will be equal only at an intermediate point in the aforesaid range. Therefore, if the switch A is in seal position, gage G is connected to the output of booster relay 30, and the process is in a state in which the controller C can take over control with satisfactory results, the proper set point pressure can be determined simply by adjusting it to the point at which booster relay output changes between minimum and maximum as indicated by deflection of the pointer of gage G an amount corresponding to the change in booster relay output.

In actual practice, it is possible to obtain an almost exact match, in effect, since it is possible to establish a set point pressure such that bellows 23 will balance bellows 21 with the baffle located at substantially half-way through its minute throttling range. With switch A in seal position and the pointer of gage G at one scale extreme, knob 14 is turned in such direction that eventually the said pointer begins to move toward its other scale extreme. At this point, knob 14 is turned no further unless it is determined that the pointer will surpass or fall short of the mid-point of the scale. Obviously, if the pointer overshoots mid-scale, knob 14 will then be turned in reverse to drive the pointer back toward mid-scale, while if the pointer undershoots mid-scale, knob 14 will be turned further in the direction in which it was first termed. In this manner the pointer can be "inched" into an about mid-scale position about which it will generally fluctuate slowly with an amplitude amounting to a small fraction of full-scale deflection. The setting of knob 14 at this time is such that set point pressure and process variable pressure are substantially identical, in effect, at least, irrespective of what is indicated by the pointer of set point transmitter T and gage G on their respective scales. Switch A may now be put in automatic position with full assurance that no bump will result because of a mismatching error arising from idiosyncracies in the calibrations of gage G and of set point transmitter T.

Transfer from automatic to manual control in the case of a long time constant process may be carried out in the usual way, since as pointed out before, a "bump" due to transfer to manual is not significant under the usual circumstances of such transfer. To transfer from automatic to manual, it is only necessary to note the controller output pressure reading on gage G while switch A is in automatic position, put switch A in seal, adjust knob 14 until pointer 15 is at a point on scale 16 corresponding to said reading, and put switch A in manual position, these steps being taken in the order in which they are stated.

The foregoing implies that the sought-after matching is a matter of getting equality between process variable pressure and set point pressure. While this is the direct goal in those types of matching involving comparative scale readings of the values of process variable and set point, or the pressures representing process variable and set point, such is not actually attempted in control point detection.

The functional tendency of a controller of the general type involved is to operate the final process control element so that the process attains the control point, with the controller in a balanced state wherein its baffle is in an intermediate position of its nozzle throttling range. In a symmetrical controller of the Jaquith type the position of balance is theoretically attained when all the pressures in bellows 20 to 23 are identical in value. In a practical controller, however, no precision of construction can be expected such that equality of bellows pressures exists when the controller is balanced.

However, in seal, the controller C can be balanced at a point wherein while the effect of set point pressure and process pressure positions the controller baffle half-way in its throttling range, the said pressures will not be equal. For the purpose of establishing the proper set or control point with respect to which the controller should measure deviation of the process variable, such point of balance must be determined.

Obviously, control point detection determines the point of balance as such, whereas indicated equality of set point and process variable correctly indicate balance only if the indications are correct and the controller is ideal.

The quality of gage G has nothing to do with the precision of set point detection, since correct set point exists in fact when the pointer of the gauge G is substantially at a mean position arrived at by the procedure described supra.

When set point detection is attempted with a controller such as shown in FIGURE 1, the flow impedance of the reset and rate resistances 25 may prevent quick determination of the control point, hence, it may be necessary to nullify the effect of resistances 35, in order to prevent bellows 20 and 22 from affecting the balance between bellows 21 and 23. The interference is due to the fact that the reset restriction normally has a much higher time constant than the rate restriction, hence, unless the value of valve pressure at the time switch B is put into seal has existed for some time prior during manual control, it will be necessary to wait until the valve pressure has equalized between bellows 20 and 22, before attempting to detect the control point. Nullifying the effect of the flow impedance, however, will obviate waiting.

In accordance with our invention, we provide a bypass switch 39 including a pair of shut-off valves 38 and a diaphragm 40. As shown in FIGURE 1, one side of a diaphragm 40 is connected to port 3 and the other side thereof is connected to point X, a common point in the connection of restrictions 35 to port 4 and the output of booster relay after it has passed through cut-off relay 31. In operation, supply pressure is effective on diaphragm 40 at the same time it is effective on diaphragm 36, and at such times diaphragm 40 is deflected to operate valves 38. When operated, valves 38 allow free communication of the pressure in port 4 with bellows 20 and 22, whereas in the automatic position of switch A, the first mentioned side of diaphragm 40 is vented through port 3, and consequently valves 38 automatically shut. Hence, when control point detection is undertaken in seal position valves 38 bypass restrictions 35 and it is unnecessary to allow for equalization of pressure between bellows 20 and 22. As will be seen from the aforesaid Jacquith application the effects of bellows 20 and 22 are substantially equal and opposite when the same value of pressure exists in each. Therefore, their presence does not appreciably affect control point detection if restrictions 35 are bypassed.

As the foregoing discussion shows, where the controller is of the type with which control point detection can be practiced, manual and automatic control functions can both be had, as desired, with the circuit of FIGURE 1, even in the absence of receiver R.

However, indication of the process variable without the aid of the receiver is nevertheless desirable, since even if both automatic and manual control can be practiced as desired using gage G only as a controller output gage, i.e., connected solely to port 4 of manifold M, FIGURE 1, sooner or later it will generally be necessary to determine the state of the process variable. Again, not all controllers permit convenient practice of control point detection and process variable indication will be needed for the purpose of transfer to automatic control.

However, by providing the instrument of FIGURE 1 with a switch B capable of interconnecting gage G and either of ports 1 and 4 of manifold M, as desired, the advantages of both modes of connection of gage G can be had.

This ultimate refinement of our novel control instrument therefore permits gage G both to provide the basic function of receiver R in the absence of the latter, to wit, process variable indication, and control transfer between automatic and manual, with the additional option of control point detection, should the particular controller used permit.

Figure 2:
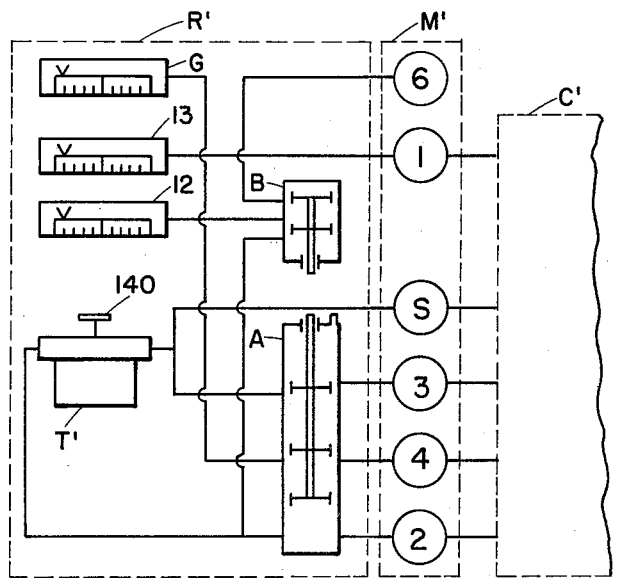
FIGURE 2 shows a prior art control system superseded by the novel system of FIGURE 1.

To aid comparison with the prior art, consider FIGURE 2, wherein is shown a typical prior art instrument circuit utilizing much the same scheme of components in a different circuit arrangement. Controller $C^1$ may be considered identical to the controller C of FIGURE 1, or may be imagined to be of much different type, structurally speaking. For example, $C^1$ may be a controller such as shown in the patent to A. W. Griswold and N. B. Nichols, No. 2,638,911, dated May 19, 1953, and assigned to the assignee of this application. If the controller of Griswold et al. is utilized, port 2 of manifold $M^1$ (FIGURE 2 of the present application), port 4 and port 1, respectively, would be connected to Griswold et al. chamber 21, pipe 65, and chamber 20. Likewise, port S may supply air to the various nozzles, etc., of the Griswold et al. controller, and port 3 would be connected to a cut-off relay (not shown in Griswold et al.) which when supplied with air would serve to cut off the booster relay of the patent from port 4 and pipe 65, while leaving pipe 65 connected to the so-called secondary stage and reset unit of Griswold et al., just as cut-off relay 31 of FIGURE 1, this application, serves to cut off booster relay 30 from the connection of bellows 20 and 22 to port 4.

The manifold $M^1$ of FIGURE 2 lacks ports 7 and 5 but, like manifold M, the remaining ports 6, 1, S and 4 are respectively connected to an external pressure representative of a variable, an external pressure representative of the process variable applied to controller $C^1$, a source of operating air, and a process control valve or equivalent load.

Switches A and B, and gages 12, 13 and G in FIGURE 2 are identical to the similarly numbered elements of FIGURE 1. However, as indicated by FIGURE 2, gage G is effectively in fixed communication with port 4, and hence always reads valve pressure, irrespective of whether valve pressure is the output of set point transmitter $T^1$ or of controller $C^1$. Moreover, gage 12 is switched by switch A between set point pressure and the external pressure in port 6, and hence two gages are provided that at times read the same pressure simultaneously, to wit, gage 12 reads set point pressure any time it is desired to actuate switch B to the position in which the switch seals bridge the connections of gage 12 to switch B, and the connection of transmitter $T^1$ with switch B, whereas gage G reads set point transmitter output whenever switch A is in manual position, i.e., when the lowermost seal of switch A and the bottom end wall of the switch bridges the transmitter connection to the switch and the switch connections to ports 2 and 4. The unnecessary duplication of function by the two gauges stems directly from the fact that the set point regulator or transmitter $T^1$ does not indicate the extent of rotation of knob 140, which knob serves to set the magnitude of the regulator pressure output into port 4. Other than requiring the usual set point pressure gage for indicating its output, transmitter $T^1$ is the equivalent of transmitter T in FIGURE 1.

Another disadvantage of the prior art practice of actually measuring set point pressure output with a pressure gage is that if, for example, set point transmitters are to be switched after the process has started, it is not readily possible to prevent a disturbance due to the fact that the operator cannot set the replacement transmitter until he plugs it into the manifold. Therefore, he must seal off the valve pressure in port 4 from controller output and adjust the output of the set point transmitter using gauge 12, before going back to automatic control. Since in our invention the transmitter is self-indicating, no such difficulty arises because, if it is removed, the self-indicating characteristic of its replacement permits one to set the latter as close to the desired set point pressure as the relative uniformity of the transmitters permit before connecting the replacement to the manifold. That is, before the transmitter to be replaced, the replacement is adjusted to indicate the desired set point. Hence, replacement is a quick process, and involves no adjustment time in the period in which no transmitter is connected to the set point bellows. Therefore, it is not necessary to seal the valve pressure in the valve for the purpose of replacing a set point transmitter.

To complete the parallel between FIGURES 1 and 2, the switch B and port 6 have been provided in FIGURE 2 to permit indication of either set point regulator output or of some pressure such as another process variable. However, the switch B and gage G are still encumbered with the task of indicating set point pressure at times, since our inventive concept of providing a self-indicating set point transmitter or regulator is not utilized.

The receiver $R^1$, it will be noted, includes the major portion of the instrument of FIGURE 2. If receiver $R^1$ is removed, all that will remain will be manifold $M^1$, controller $C^1$ and a housing (not shown in FIGURE 2, but in the nature of housing 117, FIGURE 4). Hence, it is obvious that although FIGURES 1 and 2 correspond component for component, the particular arrangement thereof shown in FIGURE 1 makes the difference between essentially full operational ability and none at all, in the absence of a receiver. In addition, whereas self-indicating transmitter T permits use of gage 12 solely to measure the pressure in port 6, it is only by virtue of a switch B that FIGURE 2 permits even partial use of gage 12 for that purpose. Hence, whether the two instruments are compared with their receivers in or out, our novel control instrument is more versatile than its prior art counterpart, yet the component complement of the latter is equivalent to that of the former.

It is not to be concluded from the foregoing that the receiver, or even gauge 12, is rendered entirely superfluous by our invention. In actual practice, the receiver is a much more complex and bulky entity than FIGURE 1 implies, since it generally includes recording mechanism and instrument ancillaries such as alarms, limit switches, as well as a number of more or less complex pressure gauges. Such a receiver, while not absolutely essential for automatic control purposes, is often preferred by the user to a simpler form (amounting to no receiver at all) in spite of the fact that it takes up the major part of the instrument bulk mounted in a panel.

As the gauge 12, while it may sometimes be omitted, it is not necessarily a superfluous feature, since, at the very least, it is often the case that it may be used to keep track of an additional variable associated with the process being controlled.

In fact, since the set point indicating mechanism actuated by knob 14 is somewhat less bulky than the set point pressure gauge it supplants, some leeway is provided allowing addition of a third pressure gage to the receiver R. As a result, the slide 54 can support three gages so that five separate indicating devices become available.

This arrangement has the advantage of permitting one instrument to indicate practically all the information of interest in a cascade control system, namely in addition to internal set point and the pressures in ports 1 and 4, indication of the external set point pressure and a second process variable of which said external set point pressure is a function, can also be indicated. In contrast a prior art instrument would need two additional gauges to do the same, and the addition would be at the expense of a greater relative increase in instrument bulk.

Be this as it may, the fact remains that the receiver is an important element of the instrument, and the commercial embodiment of our invention, like the prior art, devotes approximately the major part of its bulk to the receiver.

Thus far, the advantages of our invention have been pointed out at length without extensive reference to actual details as to format. FIGURES 3 and 4, however, supply these details in the form of an instrument assembly generally representative of present day panel-mounted individual instruments, but modified in certain particulars to conform to our invention, while at the same time adhering closely to conventional standards of space requirements, and so forth, so as to be compatible in terms of replacement of prior art panel instrumentation.

According to FIGURE 4, the instrument is comprised of, from back to front, casing or housing 117, manifold 116, and casing or housing 115. Housing 115 encloses a receiver R, i.e., the mechanisms on a base plate or slide 54, a transmitter T, switches A and B, and one face of a manifold 116, whereas casing 117 houses a controller C, attached to the other face of the manifold 116. The controller may also be located remote from the manifold and connected thereto by a more or less extensive piping system corresponding in substantially all respects but length to the more direct connections existing between controller and manifold when the former is mounted directly on the latter.

Supposing that FIGURE 4 embodies the instrument of FIGURE 1, one of the receiver gages can be omitted, or a third gage may be added, depending on whether or not it is desired to record and/or indicate one or several variables in addition to the process variable to which the controller responds.

External connections, as to the process control valve, a supply of clean, dry, instrument-operating air at a more or less fixed pressure, and so on (none of this shown) are conveniently made through taps (not shown) in the exposed sides of the manifold.

In FIGURE 4, a sort of escutcheon plate 10 at the forepart of the instrument casing 115 frames the exhibiting devices of the receiver R, pointer-stylus 111, pointer 112, pointer 113, pointer 15 and pointer 53 respectively representing the indices of three pressure gages, of transmitter T, and of gage G, the remainder of the devices associated with said indices lying within the case 115.

Figure 5:
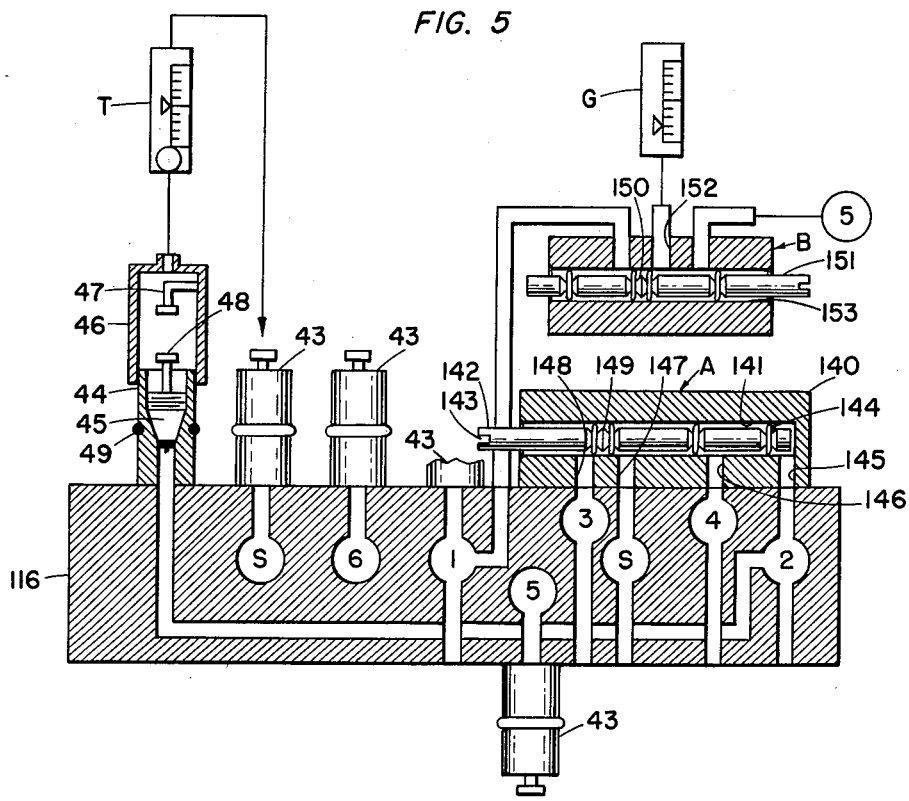
FIGURE 5 shows a manifold adapted to interconnect the controller and other compents of FIGURES 3 and 4.

Main slide or base 54 supports various of the components within casing 115, namely, a record chart driving mechanism 50 for moving record chart past the stylus-pointer 111, pressure responsive mechanisms denoted collectively by box 56; and indicator devices operated by said mechanisms, indicated generally by box 55, i.e., the boxes 55 and 56 represent collectively the gages including indices 111, 112 and 113. In addition, slide 54 also supports a sub-manifold 57, which provides for connections of the said gages to manifold 116. In practice, sub-manifold 57 is connected to manifold 116 by self-sealing plug-in connections, such as shown in FIGURE 5, hence, the receiver R, i.e., the components on slide 54, is removed simply by pulling slide 54 out of the casing. Transmitter T, on the other hand, is fixed to the casing 115 independently of slide 54 and the components thereon, although the transmitter T itself may also be made removable, in analogous fashion, although remaining mounted independently of the slide 54.

Neither FIGURES 3 or 4 show switches A and B. However, they would be located in the case, somewhere near the rear lower portion, and levers 51 and 52 would be provided for operation of A and B switches, respectively, a space between the slide 54 and the bottom of casing 115 being provided to permit lateral deflection of levers 51 and 52 so as to reciprocate stems 26 and 24 of switches A and B as desired. Conveniently, slide 54 may have a flange 58 forming a slot 59 between escutcheon 10 and said flange, Indicia O and P, M, S and A stand respectively for controller output and process variable positions of switch B, and for manual, seal and automatic positions of switch A.

The manifold 116 may be what amounts to a block or slab of metal having various passages therein. As shown in FIGURE 5, such block includes the various ports 1–6 and S as parts of said passages (the instrument shown in FIGURE 3 actually requires a port 7 for an additional gage of course). Various nipples 43, 44 projecting from the block serve to connect the various components to the manifold; to avoid confusion not all such nipples are shown. However, each nipple forms a means for quick connection and disconnection of components, and hence the ports in the block may terminate in nipples positioned to accept the set point transmitter, sub-manifold 57 and controller 117, since it will usually be such entities as these that require quick connection to and disconnection from the manifold. Like FIGURE 1, FIGURE 5 does not illustrate any external connections to the manifold, but obviously ports 1, 4, 6 and S will be provided with means for connecting the external apparatus involved in the operation of the control instrument to the involved ports.

Each of the aforesaid nipples is a self-sealing "plug-in" connector, such as shown in the case of nipple 44 which supports the core 45 of a valve much like the familiar type long used as the filling valve of automobile tires and innertubes. A tubular connector 46 telescopes loosely over the nipple and in its interior carries a valve-stem depressor 47 for depressing the stem 48 to permit air to flow through core 45. An O-ring 49 surrounding nipple 44 seals the annular interstice between connector 46 and nipple 44, the parts being proportioned so that if the connector is plugged on to nipple 44 so as to depress stem 48 and open the valve, or is withdrawn from the nipple so as to permit the stem 48, which is biased by a spring (not shown) toward valve-closing position, to close the valve, the interstice will be sealed by O-ring 49 as long as the valve is open. Nipple 44 connects to port 2, and connector 46 connects to the output of transmitter T. The nipple 43 next adjacent nipple 44 connects the supply pressure of port S to the transmitter T in analogous fashion. (Port S is shown in duplicate for clarity, although in practice port S may be simply one passage or port of sufficient extent and proper conformation to connect various nipples and switch connections to the exterior source of supply pressure.)

Switches A and B are conveniently supported on the manifold, although switch B, disclosed and claimed in our aforesaid divisional application, is shown elevated above the block, for clarity.

While the controller, transmitter and receiver connections to the block are preferably "plug-in" connectors, the connections of switches A and B, manifold and gauge G, and the external connections to the manifold, may be simpler and/or more permanent connections of any convenient type, since, unlike the receiver, controller and set point transmitter connections, it is generally contemplated that there will be no need of tampering with said permanent connections during instrument operation.

Switch A consists of a block 140 having a straight circularly-cylindrical bore 141 therein, a plunger or piston 142 having a fork 143 or like means for connecting an actuating device such as lever 51 thereto, and four O-rings such as that indicated by reference numeral 144 mounted in circumferential grooves on said plunger. Plunger 142 fits sufficiently loosely in bore 141 so as to leave an annular interstice between plunger and bore wall allowing free flow of air along the length of the bore, except for the O-rings. Side ports or passages 145 to 148 serve to communicate the said annular interstice with manifold ports 2, 4, S and 3, respectively, the block 140 being formed at the outer surface thereof where the ports terminate to get the surface of manifold 116 over appropriate passages communicating the various passages 145 to 148 with the manifold ports 2, 3, 4 and S. A suitable gasket or equivalent sealing means (not shown) may be provided to seal the switch-manifold connections from the environment exterior to the combined switch and manifold.

The O-rings, of inner diameter smaller than the plunger grooves so that they are slightly stretched when in place in their grooves, and of outer diameter slightly larger than the inner diameter of the bore, form circumferential seals along the length of the aforesaid annular interstice, separating said interstices into portions in which flow between portions is prevented by the O-rings, since these last are compressed between bore and plunger to sealingly contact circumferential surface portions of the wall of said bore and the plunger.

One O-ring pair, denoted collectively by the numeral 149, are spaced just far enough apart from each other to seal a space between them sufficient to seal the opening of passage 148 into bore 141 when the plunger 142 is moved to the left. This prevents air from port S from blowing by passage 148 to atmosphere as the seal represented by pair 149 passes over said passage.

The switch B is of the same general type of construction as switch A. Like switch A, the plunger 151 of switch B has an O-ring pair 150, which, analogous to pair 149, close off the switch side passage 152 to which gage G is connected in order to prevent air from blowing by said passage when the pair 150 passes thereover. If this blowing-by were not prevented, air would be transferred between the process bellows 21 and the booster relay output of the controller with possibly serious consequences, if the transfer of air were reflected in the process bellows 21 as a pressure change.

Bore 153 and plunger 151 of switch B extend entirely through the switch blocks. Hence, no compression effects will occur as might if the switch B of FIGURE 6 were constructed with one end of the bore closed.

The spacing of O-rings and switch side passages is shown in FIGURE 5 to the scale of practical embodiments of switches A and B capable of performing the switching functions described in connection with FIGURE 1.

Switches thus constructed have been found to be capable of years of constant and substantially leak-free service without maintenance. In addition, they are of the utmost simplicity of construction, and require the barest minimum, and the simplest, of precision machining in manufacture.

Switch B, as suggested by the drawing, could have tubing-type connections, but could still be more or less flush-mounted on the manifold, or could be flush-mounted and flush-connected to manifold 116 like switch A, instead of by tubing-type connections.

The interior structure shown inside manifold 116 is not to be taken too literally, the "port" format being used more as easily identifiable symbols denoting the passages, tubulations, grooves between mating surfaces, and so on, that might be utilized to define the various interconnections needed, rather than to suggest the specific form, shape, etc., taken by the said interconnections.

As has been disclosed supra, for the purpose of control point detection, an automatic bypass switch is provided according to the invention for nullifying the effect of the feedback impedance of the controller in order to speed up the process of control point detection. However, where a bypass switch is used, and is connected to the same port as the controller cut-off relay, it is desirable that the cut-off relay and bypass switch do not perform their respective functions simultaneously, but rather in such sequence that controller feedback impedance is never bypassed until after the output of the controller booster relay has been cut-off in the cut-off relay.

According to the invention, we have devised a novel combined cut-off relay and bypass switch which combines structural simplicity and economy of parts with the feature of automatically sequencing closure of the cut-off relay and opening of the bypass switch, in the order mentioned, so as to prevent any disturbances that would arise were the operations of relay and switch improperly coordinated.

Figure 6:
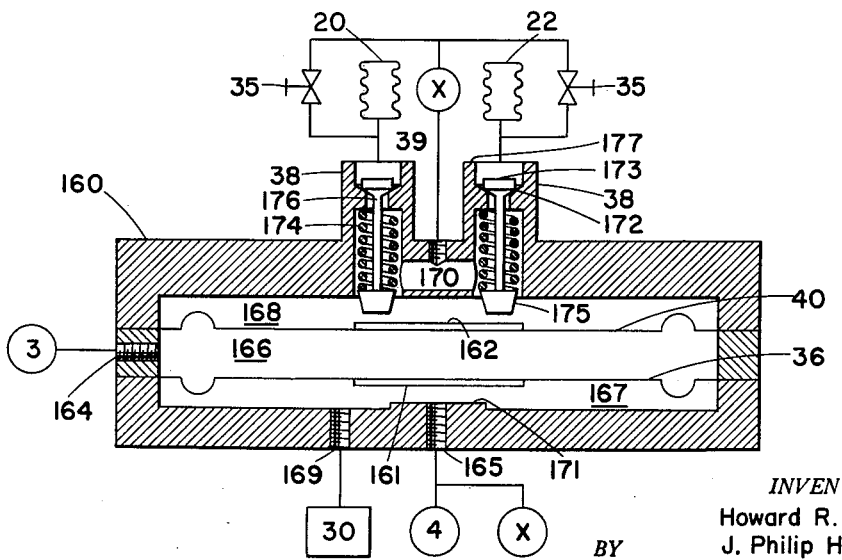
FIGURE 6 shows schematically the details of a novel combined feedback-shorting or by-pass switch and cut-off relay.

The bypass switch 32 is conveniently combined with the cut-off relay 31 for the sake of making controller C a compact "package." As shown in FIGURE 6, the diaphragms 36 and 40 divide a hollow body 160 into three chambers, including a center chamber 166 between the two diaphragms and having a connection 164 to port 3 of a manifold M, such as shown in FIGURE 1, and two side chambers, 167 and 168, each defined by one diaphragm and part of casing 160. Chamber 167 communicates via connection 169 with the output of booster relay 30, and via a connection 165 with manifold port 4, the connection 169 being open or shut depending on whether valve disk 161 is unseated or seated on a seat 171, which seat may be simply a flat boss projecting toward disk 161. Finally, chamber 168 communicates with bellows 20 and 22, either via restrictions 35 or via valves 38 and connection 39.

Hence, if the common point X of FIGURE 1 is connected to connections 39 and 165, the output of booster relay 30 will or will not be admitted to bellows 20 and 22 and port 4, depending on the state of the valves in the combined bypass switch and cut-off relay.

Each of the valves 38 includes a stem 176, one end of which is provided with a valve plug 173 seated on an annular valve seat 172 formed in a nipple 177 projecting from body 160, and normally biased closed, as by a spring 174 thrusting against head 175 on the remaining end of stem 176.

Since controller output pressure normally reigns in chambers 167 and 168, when chamber 166 is vented to atmosphere, diaphragms 36 and 40 hold disks 161 and 162 as shown, so that the output of booster relay 30 communicates with port 4 and, via restrictors 35, with bellows 20 and 22. Valves 38, however, are closed, and controller output dead-ends via connection 39 and cross-passage 170 and nipples 177 in chamber 168. If, however, chamber 166 is pressurized, as by moving switch A to seal position to admit the 20 p.s.i. or so of supply pressure to chamber 166, disk 161 seats on seat 171 to cut-off booster relay output from port 4, whereas diaphragm 40 forces disk 162 against valve heads 175, thereby unseating plugs 173, whereby restrictors 35 are bypassed by a substantially direct fluid connection between point X and each bellows through cross-passage 170 and the nipples 177.

Since operation of the bypass switch and cut-off relay brings about substantially direct connection of bellows 20 and 22 with port 4, it is desirable to prevent the possibility of controller output from being admitted directly to bellows 20 and 22. The reason for this is that proper operation of the controller is predicated on the proposition that the desired controller output into port 4 is that obtained while the said output is fed back to the reset and follow-up bellows via restrictors 35. Hence, if, during transitions between seal and automatic positions of switch A, if valves 38 are open and disk 161 is not seated on seat 171, direct feedback to bellows 20 and 22 from booster relay 30 may occur. If this happens, the controller output will be connected to port 4 while in a high-gain state (due to bypassing of restrictors 35) and, hence, exert an output pressure therein which does not correspond to the proper control point, but is instead either the maximum or minimum output of the booster relay. The result, of course, would be an undesired movement of the process control valve connected to port 4.

However, if the bypass switch and cut-off relay are arranged as in FIGURE 6, and diaphragms 36 and 40 are made identical as to mass (including disks 161 and 162), spring constant, spacing of disks 162 and 161 from valve heads 175 and seat 171, respectively, substantially the only asymmetrical aspect of operation of the relay and switch, is that valves 38 are biased by springs 174, whereas the valve formed by disk 161 and seat 171 is not. Hence, though admitting pressure to chamber 166 causes disk 162 to strike valve heads 175 at the same time disk 161 seats on seat 171, the springs 174 delay the opening of valves 38 to a time an instant after the time of seating of disk 161. Hence, the output of booster relay 30 is cut-off from the common point X before valves 38 open. Likewise, if chamber 166 is vented, the bias of springs 174 accelerates the seating of plugs 173, so that valves 38 are closed an instant before controller output is admitted to point X through connection 169.

It is to be noted that the automatic sequencing of the valve opening and closing operations involved in the combined bypass switch and cut-off relay follow in part from considerations of compactness and economy of parts. For example, the common pressure chamber 166 obviates any effect on proper sequencing due to flow-characteristics of connecting plumbing, such as might occur if bypass switch and cut-off relay were physically separate entities having separate pressure chambers and separate connections to some common point in connection with port 3. In addition, however, sharing of casing structure and connections by the relay makes for economy of structure.

Since the feedback restrictions shown in FIGURES 1 and 6 are in the way of being adjustable valves, it is conceivable that, instead of bypassing them, they could be directly operated upon by a pressure responsive device to go to full open, for the purpose of control point detection. While we believe such practice to be within the scope of our invention, a bypass is preferred as the simpler and more practical of alterations in the feedback circuit of the controller that would permit of nullifying the feedback impedance for purposes of control point detection.

Our inventive contributions arise in a rather densely developed prior art environment, namely, integrated or "packaged" control instruments of various types: electrical, pneumatic, hydraulic, or whatever, wherein the central problem is to pack as much as possible into a more or less standard package. At the same time, rather uniform standards have been developed as to what must be in the package in the way of control functions (such as set point adjustment, manual and automatic control, etc.), and exhibiting functions (namely, indicating, recording, signaling, and so on). The changes we have wrought in prior art teachings, regardless of how their magnitude may be assessed in the abstract, when considered in the light of prior art teachings, results in economies, versatility, and efficiency of operation, greatly superior to prior art efforts, and represent a patentably inventive contribution to the art.

Although under these circumstances, the benefits of our invention can only be fully appreciated by an extended discussion of specifics, which we have provided supra, our invention is not limited to the pneumatic instrument field, since the principles of component arrangement, and so on, apply equally well to instruments like in use but performing their functions by use of energies of forces such as electricity, hydraulics, or combinations of such energies or forces. Hence, none of the claims appended hereto is to be deemed limited to pneumatic devices, unless its language necessarily requires such interpretation.

While our invention evolves from the particular context of so-called "miniaturized" an instrument format wherein (as in FIGURES 3 and 4) the effort has been made to confine frontal area of the instrument to the minimum needed for the purposes of recording and indicating, as well as for regulating set point, and manipulating switches A and B, we believe it is obvious that spatial relations (as opposed to functional) among the components are not critical. For example, the superiority of the instrument of FIGURE 1 over the prior art instrument of FIGURE 2 would remain irrespective of whether the instruments were embodied in the compact commercial format corresponding to FIGURES 3 and 4, or in the breadboard style literally indicated in FIGURES 1 and 2.

However, it also is true that our invention has been contrived to exhibit said superiority while remaining in conformity with the peculiar requirements of panel installation. Therefore, it is particularly advantageous when embodied in the format of FIGURES 3 and 4.

While, in accordance with the statutes, we have set forth herein the best form of the invention known to us, and its manner of use, it will be apparent to those skilled in the art that changes may be made in various elements thereof without departing from the invention set forth in the appended claims describing the several instrumentalities regarded as novel and inventive.

We claim:

1. In a control instrument including a controller having a process variable pressure input, a set point pressure input and a control pressure output, said controller being responsive to a process variable pressure and a set point pressure applied respectively to the first and second of said inputs to produce a control pressure at said output; a set point transmitter having a set point pressure output for providing a fluid under pressure and an element movable to cause said set point transmitter to produce at said set point pressure output said fluid under a pressure corresponding to the extent of movement of said element; a manifold including first port means for supplying said process variable pressure input with a process variable pressure representative of a condition in a process, second port means for supplying said control pressure to a process control element for controlling said condition, and third port means for supplying said set point pressure input with set point pressure; and connections for interconnecting said controller, said manifold port means and said set point pressure transmitter so that the various pressures may be supplied as aforesaid; the improvement wherein said connections include separate connecting means for interconnecting said set point transmitter and said third port means, said connecting means being disconnectible without disturbing the said remainder of said connections, and said manifold being so constructed and arranged that the said fluid in said third port means is sealed therein when said connecting means is disconnected, whereby said controller can, at least temporarily, continue to provide a control pressure in said second port means if said set point transmitter is disconnected from said third port means.

2. The invention of claim 1 with the additional improvement of indicating means incorporated in said set point transmitter and effective to indicate the set point output of said transmitter in terms of the extent of movement of said movable element, whereby if it becomes necessary to replace the said set point transmitter with a similar set point transmitter, the movable element of said similar set point transmitter can be set to indicate the proper set point output before disconnecting the set point transmitter to be replaced, whereby substantially as soon as the said similar set point transmitter is connected to said third port means, it furnishes the proper set point pressure substantially without need of further adjustment of its movable element.

3. In a control instrument including a controller adapted to exert automatically a control effect on a process, a receiver including means for exhibiting information thereon relative to the behavior of said process, connecting means adapted to interconnect said controller, said receiver and said process, set point adjusting means adapted to be connected to said controller for regulating the said control effect in correspondence to set point adjustment, said receiver being disconnectible from said connecting means independently of said controller and of said set point adjusting means, and without disturbing either the connection of the last-mentioned means and said controller or the connections of said controller to said process, whereby if the said receiver means is disconnected, said controller can continue to exert said control effect on said process; set point indicating means operatively connected to said set point adjusting means for indicating regulation of said control effect; said set point indicating means being arranged to be operatively connected to said set point adjusting means independently of the presence or absence of said receiver, whereby in the absence of said receiver, the said control effect can be regulated by known amounts.

4. The invention of claim 3 wherein said set point adjusting means has a movable element, the extent of movement of which determines the regulation of said control effect, and said indicating means indicates the extent of movement of said movable element.

5. The invention of claim 3 wherein the set point adjusting means is a set point pressure transmitter having an element movable to vary the value of set point pressure transmitted by said transmitter, such transmitted pressure regulates the said control effect; and including the further improvement wherein said indicating means indicates the extent of movement of said element, whereby the need to measure set point pressure as such is obviated.

6. An instrument comprising a support; a manifold on said support; a receiver secured to said support and connected to said manifold, said receiver being adapted to exhibit a process variable; adjusting means for adjusting the set point of a controller, said adjusting means being supported on said support independently of said receiver and including means for indicating its state of adjustment, said manifold being adapted to operatively connect a controller in a control system including a process control device, said adjusting means and means responsive to said process variable for causing said controller to produce a control output for operating said control device in a manner determined by the relation of said set point to said process variable; said manifold also being connectible to said receiver so that the latter exhibits said process variable, and said receiver being removable from said support and disconnectible from said manifold without disturbing said adjusting means and connections of said manifold to said control system, whereby operation of said control system can continue irrespective of the presence or absence of said receiver on said support, and whether or not said receiver is connected to said manifold.

7. The invention of claim 6, wherein the said adjusting means is of the type having a manually-settable output capable of operating said control device as well as of adjusting the set point of said controller, and including switch means on said support and adapted to connect said manually-settable output to said control device, if desired, the said switch means being arranged to perform its functions irrespective of whether or not said receiver is secured to said support or connected to said manifold.

8. An instrument comprising a support; a manifold on said support, a receiver secured to said support and connected to said manifold, said receiver being adapted to exhibit a process variable; adjusting means for adjusting the set point of a controller, said adjusting means being supported on said support independently of said receiver; said manifold being adapted to operatively connect a controller in a control system including a process control device, said adjusting means and means responsive to said process variable for causing said controller to produce a control output for operating said control device in a manner determined by the relation of said set point to said process variable; said manifold also being connectible to said receiver so that the latter exhibits said process variable, and said receiver being removable from said support and disconnectible from said manifold without disturbing said adjusting means and connections of said manifold to said control system; there also being indicating means secured to said support independently of said receiver and connected to said control system so as to indicate said control output, whereby operation of said control system can continue irrespective of the presence or absence of said receiver on said support, and whether or not said receiver is connected to said manifold.

9. An instrument comprising a support; a manifold on said support, a receiver secured to said support and connected to said manifold, said receiver being adapted to exhibit a process variable; adjusting means for adjusting the set point of a controller, said adjusting means being supported on said support independently of said receiver; said manifold being adapted to operatively connect a controller in a control system including a process control device, said adjusting means and means responsive to said process variable for causing said controller to produce a control output for operating said control device in a manner determined by the relation of said set point to said process variable; said manifold also being connectible to said receiver so that the latter exhibits said process variable, and said receiver being removable from said support and disconnectible from said manifold without disturbing said adjusting means and connections of said manifold to said control system; there also being indicating means secured to said support independently of said receiver and connected to said control system so as to indicate said process variable, whereby operation of said control system can continue irrespective of the presence or absence of said receiver on said support, and whether or not said receiver is connected to said manifold.

10. An instrument comprising a support; a manifold on said support; a receiver secured to said support and connected to said manifold, said receiver being adapted to exhibit a process variable; adjusting means for adjusting the set point of a controller, said adjusting means being supported on said support independently of said receiver; said manifold being adapted to operatively connect a controller in a control system including a process control device, said adjusting means and means responsive to said process variable for causing said controller to produce a control output for operating said control device in a manner determined by the relation of said set point to said process variable; said manifold also being connectible to said receiver so that the latter exhibits said process variable, and said receiver being removable from said support and disconnectible from said manifold without disturbing said adjusting means and connections of said manifold to said control system; there also being indicating means secured to said support independently of said receiver, and switch means on said support adapted to connect said indicating means at will to said control system so as to indicate either said control output or said process variable, whereby operation of said control system can continue irrespective of the presence or absence of said receiver on said support, and whether or not said receiver is connected to said manifold.

11. In combination, a control system including a controller, a control device and first exhibiting means, connecting means arranged to interconnect said controller, said control device and said exhibiting means so that said controller and said exhibiting means are responsive to a process variable and said control device is connected to said controller, the arrangement being such that the said control device is operated to control a condition in a process, the controller responds to said condition so as to operate the said control device, and the said exhibiting means is responsive to said condition to exhibit the same; further exhibiting means so connected in said system as to exhibit the said condition, and said first exhibiting means being arranged to be operatively connected and disconnected from said system without interfering with the operation of the remainder of the said system, whereby the said system remains essentially fully operative independently of the presence or absence of said first exhibiting means.

12. The invention of claim 11 wherein the said remainder of said system also includes control point setting means so connected in said system as to cause the controller to operate said control device in such fashion as to maintain said condition in a predetermined relation to a given control point.

13. In a controller having first input means responsive to a process condition and output means for producing a control force, said first input means being arranged to actuate said output means in response to changes in said condition from a predetermined control point; control point setting means for producing a control point setting force, and said controller having second input means arranged to receive said control point setting force; said controller having third input means for receiving a feedback force, there being a connection between said output means and said third input means for applying said control force as feedback to said third input means; impedance means in said connection for modifying the effect of said feedback on said third input means, the arrangement being such that the resultant control force produced by said output means is a function of the forces applied to the said inputs; the improvement comprising switch means operable to nullify the effect of said feedback so that said resultant control force is a function of said process condition and said control point setting force alone.

14. The invention of claim 13, wherein a further switch means is provided, said further switch means being operable to disconnect said output means from said connection and to connect said control point setting means to said connection, and the first said switch means is operable to nullify the effect of said impedance, whereby said control point setting force is fed back to said second input like said control force but unmodified by said impedances; said controller being of the type wherein if the effect of said impedances is nullified the said resultant control force is effectively independent of the force received by said third input means.

15. The invention of claim 14 including switch-operating means operable to produce a switch-operating effect and wherein both said switch means are responsive to said effect to operate as aforesaid.

16. The invention of claim 14 wherein each said switch means includes an operating means responsive to an operating effect for causing operation of said switch means, there are means actuable to produce said operating effect on each operating means simultaneously, and the operating means for said first said switch means include delay means for causing response to said operating effect to be delayed, whereby upon production of said effect said further switch means operates to connect said control point setting force to said connection before said first said switch means nullifies the effect of said impedance.

17. The invention of claim 16 wherein said delay means exerts a bias on the last said operating means substantially continually opposing said operating effect, and both said operating means in the absence of said operating effect permit feedback of said control force through said impedance to said third input, and said means actuable to produce said operating effect is also actuable to remove said operating effect from both said operating means simultaneously, whereby upon removal of said operating effect the said last said operating means restores the effect of said impedance before said control force is fed back to said third input.

18. A control instrument including in combination: a controller, a set point transmitter, exhibiting means arranged to exhibit information useful for the purpose of causing at will said controller or said set point transmitter to provide operating energy for a process control device, said controller being responsive both to a variable process condition in a process controlled by said process control device and to a reference condition, said reference condition being established at arbitrarily-predetermined values by said set point transmitter, said controller responding to said conditions so as to provide operating energy for said process control device at such level as to maintain said variable process condition constant when a predetermined relation exists between said conditions; said controller being of the type wherein if the said relation exists, with the controller providing a given level of operating energy for said process control device, and said relation is subsequently departed from, the controller changes the said given level of operating energy, and applies said change to itself to produce a still further change in said given level of operating energy; said controller including feed-back means for delaying the application to itself of change in said given level of operating energy; energy level responsive means connected to said controller to respond to the energy provided for operating said process control device; means operable at will for segregating the said energy from said process control device, or for applying said energy thereto; nullifying means operable both to nullify the delaying effect of said feedback means and to prevent application by said controller of its operating energy to itself at substantially the same time; said set point transmitter being operable when said nullifying means is operated to apply its operating energy to said controller unmodified by the said delaying effect, in place of the delayed application of change in energy level by the controller to itself; means to adjust the said set point transmitter for enabling the said transmitter to apply to said controller operating energy of a range of levels including a control point level corresponding to that level which would exist if the said predetermined relation is to exist between said conditions, whereby if operating energy applied by said transmitter as aforesaid is varied through said range of levels, the energy level provided by said controller corresponding to said control point level will be characterized by a response thereto of said energy level responsive means that is effectively qualitatively different in character from responses of said energy level responsive means to any other level of energy supplied by said controller in response to any of said range of levels other than substantially only the said control point level.

19. A controller switch comprising first valve means controlling a bypass around the impedance in a feedback circuit means in a controller, said first valve means including a bias means tending to cause the valve to cut off said bypass, second valve means equivalent to said first valve means but lacking a bias means, said second valve means controlling the admission of the control output of said controller to said feedback circuit, pressure responsive means adapted to be pressurized and responsive to pressurizing to mechanically act simultaneously and with like effect on each said valve means to bypass said feed-back circuit means and to cut off said output, whereby due to said bias means the said first valve means opens said bypass after the said second valve means cuts off controller output, when said pressure responsive means are pressurized, whereas if the pressure is released from said pressure responsive means, the said bypass closes before the said controller output is admitted to said feedback circuit means.

20. A sequencing valve comprising a pair of pressure-movable walls forming the walls of a pressure chamber, arranged so that if the pressure outside the chamber is different from the pressure inside the chamber, the walls will tend to move away from or toward one another depending on the sense of the pressure difference, a plurality of valves, there being at least one valve located adjacent to each wall and adapted to be actuated by movements of said walls, the arrangement being such that both valves are actuatingly contacted by the walls at the same instant when the said pressure difference is of a given sense and magnitude; and one valve being biased against actuation whereby actuating contact of the walls causes the actual actuation of each valve to take place at different times.

21. An automatically-sequenced plural valve system comprising a pair of valve means, each openable and closable in response to the movement of an actuating means; pressure responsive actuating means arranged to operate said valve means in response to sufficient pressure change; bias means arranged to continuously oppose movement of one of said valve means between open and closed conditions, each of said valve means otherwise requiring an equal amount of operating force, and said actuating means being arranged to exert equal operating force on each valve at the same rate in response to pressure change; whereby if sufficient pressure change is exerted on said pressure responsive actuating means, the biased valve means will move from one of its open and closed positions to the other after the unbiased valve means moves from one of its open and closed positions to the other, when the said actuating means must overcome the bias of said bias means; but if the biased valve is moved with the aid of said bias means, said biased valve moves from the said other of its open and closed positions to the said one of its open and closed positions before the said unbiased valve means reaches its corresponding position.

22. The invention of claim 21 wherein a pair of substantially identical pressure responsive means are provided, one for each of said valve means, and said identical pressure responsive means together form a chamber to which pressure is admitted and vented for actuation of said valve means to their several positions.

References Cited in the file of this patent

UNITED STATES PATENTS

| | | |
|---|---|---|
| 2,501,957 | Moore | Mar. 28, 1950 |
| 2,569,676 | Kenyon | Oct. 2, 1951 |
| 2,584,455 | Hughes | Feb. 5, 1952 |
| 2,638,911 | Griswold et al. | Mar. 19, 1953 |
| 2,822,783 | Clifton et al. | Feb. 11, 1958 |
| 2,851,047 | Eller | Sept. 9, 1958 |
| 2,857,928 | Lerner et al. | Oct. 28, 1958 |
| 2,880,755 | Brown | Apr. 7, 1959 |